United States Patent [19]
Cyr

[11] Patent Number: 5,008,859
[45] Date of Patent: Apr. 16, 1991

[54] ACOUSTIC TRANSPONDER RECEIVER CIRCUIT

[75] Inventor: Reginald Cyr, Santa Barbara, Calif.

[73] Assignee: United States of America, Washington, D.C.

[21] Appl. No.: 281,139

[22] Filed: Dec. 7, 1988

[51] Int. Cl.$^5$ .............................................. H04B 1/59
[52] U.S. Cl. ......................................................... 367/2
[58] Field of Search ........................................ 367/2–6; 455/82, 83

[56] References Cited

U.S. PATENT DOCUMENTS 3,320,576  5/1967  Dixon et al. ......................... 367/135

Primary Examiner—Daniel T. Pihulic
Attorney, Agent, or Firm—Robert M. Wohlfarth; John P. Tarlano

[57] ABSTRACT

A transponder that responds differently to two different input signals. The first input signal is at a first frequency. The first input signal is detected by a first powered detector that operates at the first frequency. The transponder responses in a first mode to the first input signal. The second input signal consists of short pulses at the first frequency and at a second frequency. The transponder responds to short pulses at the first frequency by powering a second detector. The first and second detectors then detect the second input signal. The transponder responds in a second mode to the second input signal.

4 Claims, 3 Drawing Sheets

ACOUSTIC TRANSPONDER RECEIVER CIRCUIT

BACKGROUND OF THE INVENTION

There has been a need for a transponder receiver circuit that will provide both an interrogate response signal and a beacon signal and yet uses only a single input transducer. The receiver circuit responds to two different input signals.

BRIEF DESCRIPTION OF THE INVENTION

The present invention is a transponder receiver circuit that has a single input transducer. The transponder receiver circuit will cause an interrogate response signal to be sent in response to an interrogate input signal and will cause a relatively long a beacon response signal to be sent in response to a beacon input signal. The disclosed transponder receiver circuit has means to determine whether an interrogate input signal or a beacon input signal is coming into it.

Further, the disclosed transponder receiver circuit has logic circuitry that requires that a first interrogate input signal be repeated before it will cause an interrogate response signal to be sent. The disclosed transponder also has logic circuitry that requires that a beacon input signal be repeated before it will cause with an beacon response signal to be sent.

DESCRIPTION OF THE PREFERRED EMBODIMENT

Figure 1A:
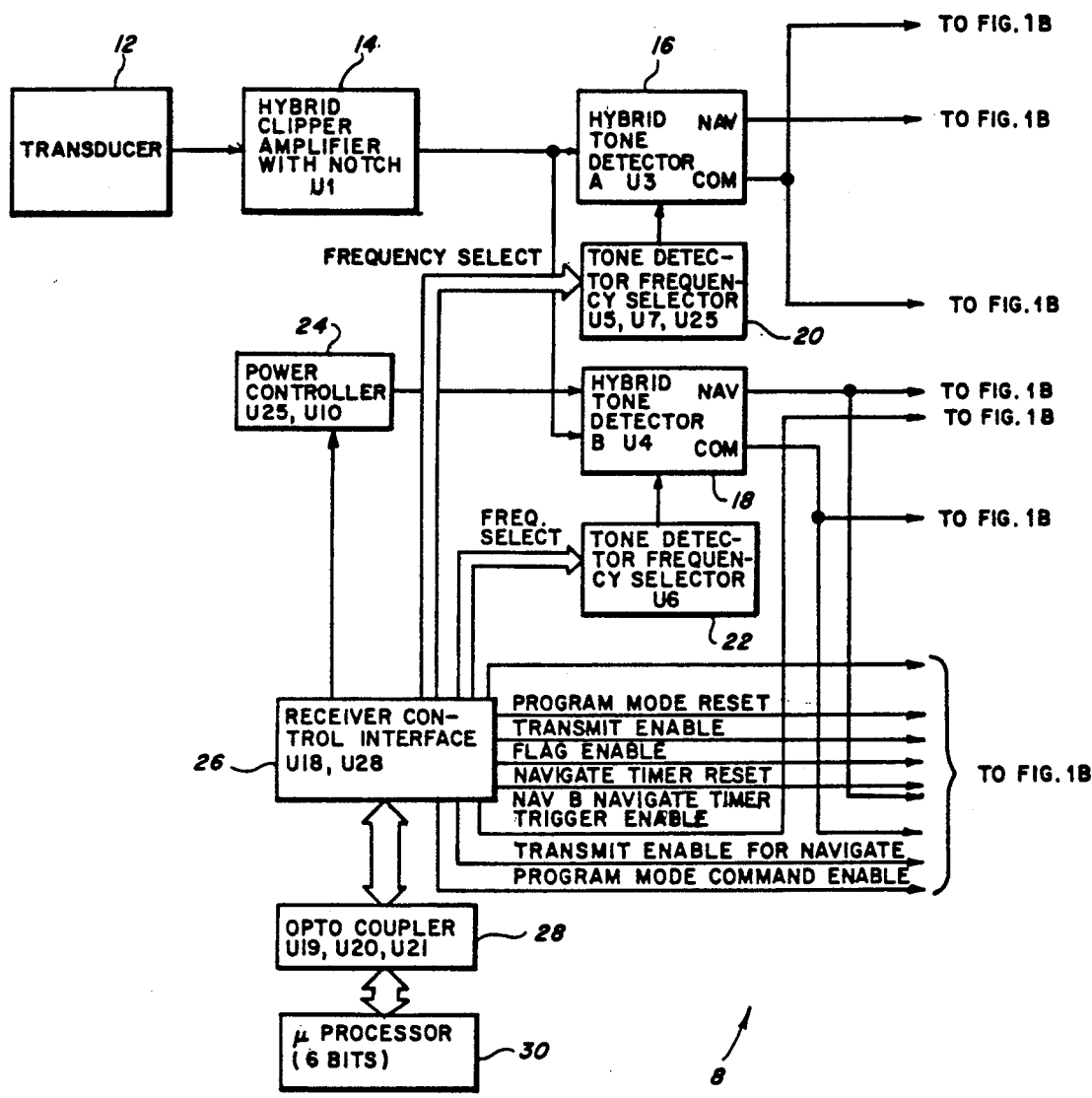
FIGS. 1A, 1B and 1C taken together show a block diagram of the transponder receiver circuit of the present invention.
Figure 1B:
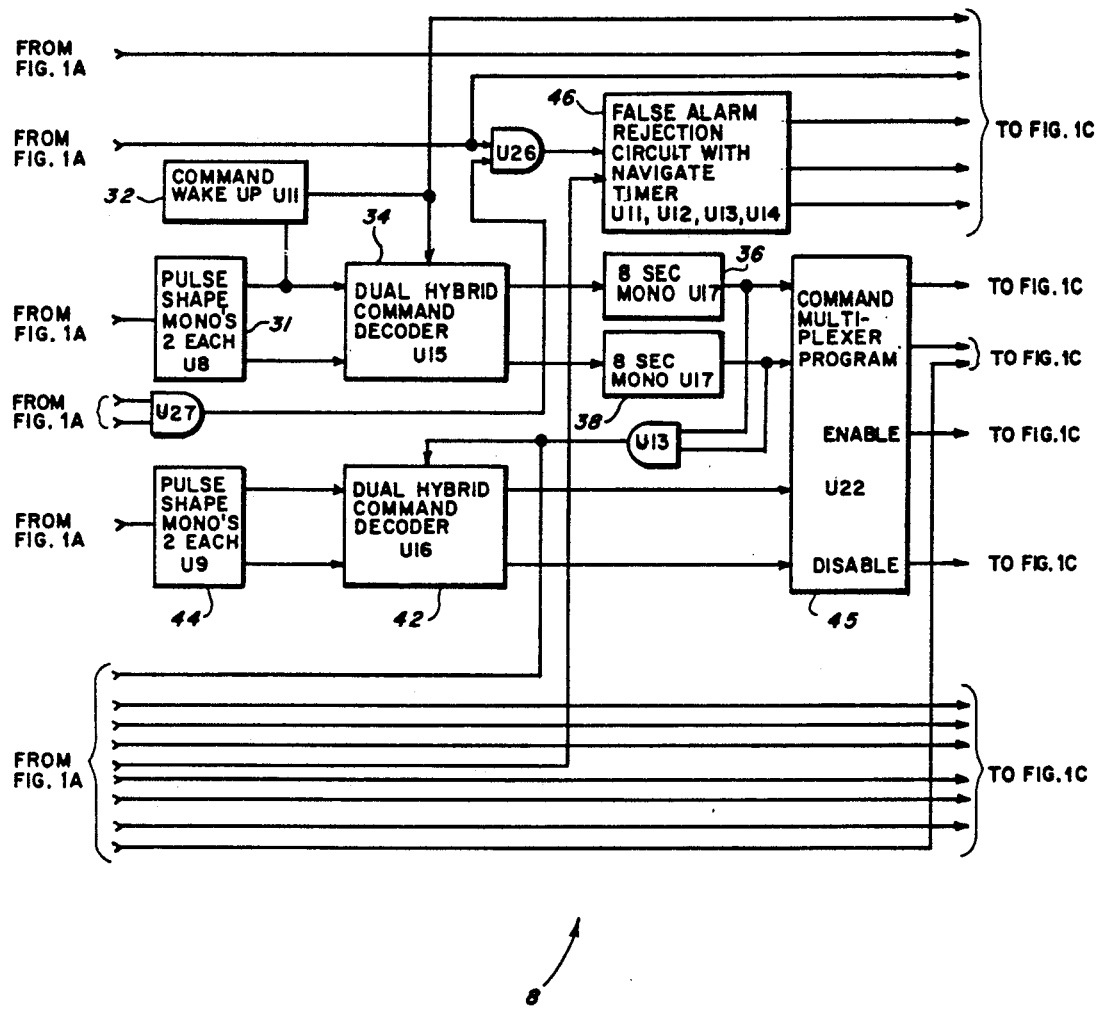
Figure 1C:
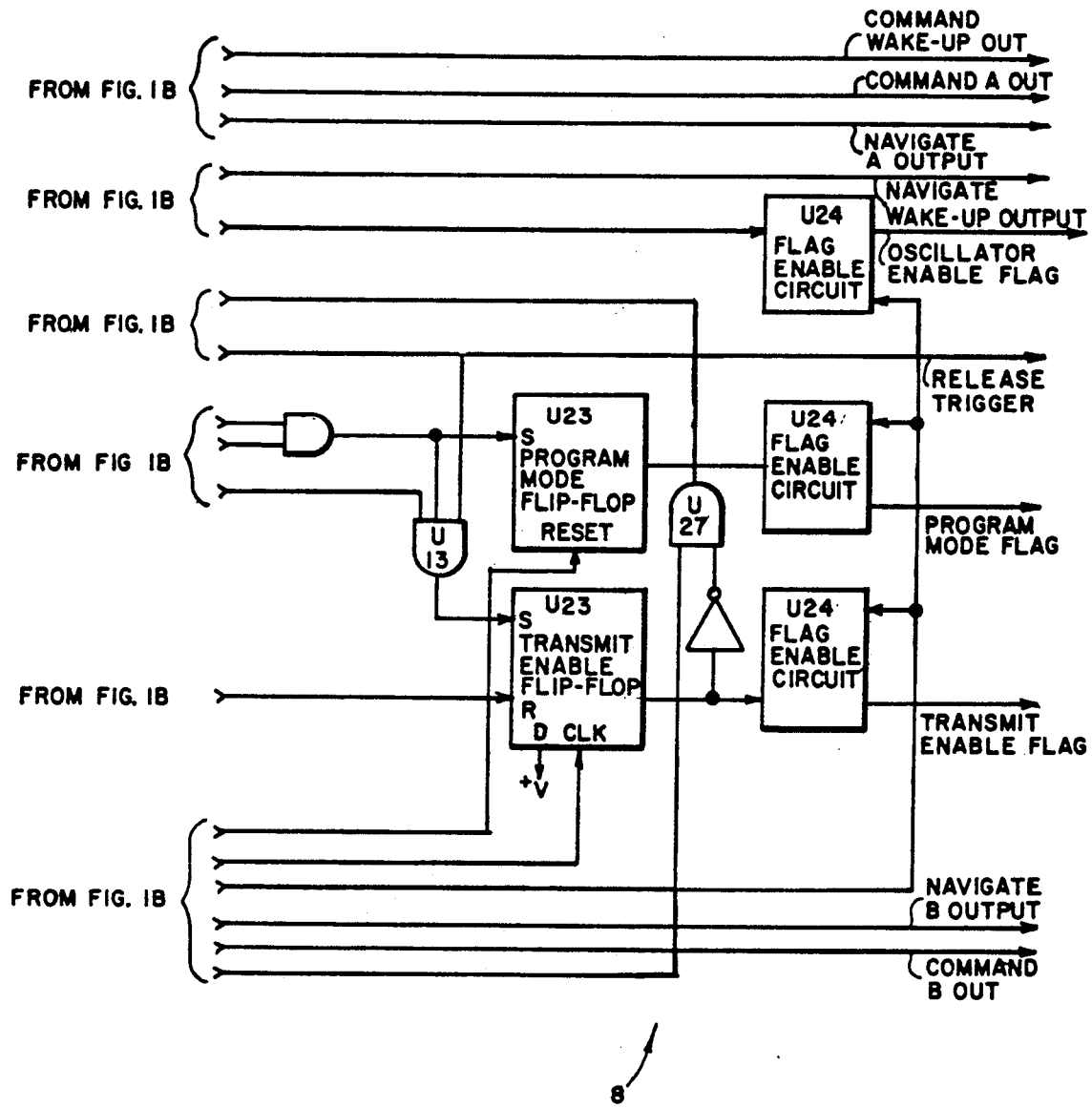

FIG. 1 shows a transponder receiver circuit 8 for use in an underwater transponder. The transponder circuit 8 contains an acoustic transducer 12. The acoustic transducer 12 has a wide band width and provides a voltage out for various acoustic frequencies in.

A hybrid clipper amplifier 14 has a constant voltage output, for varying voltage inputs. It has a band pass associated with it. The transducer 12 sends out an AC signal in response to a pressure wave. The amplifier 14 sends out an AC voltage in response to the AC signal from the transducer 12. The voltage out of the amplifier 14 is at a reduced level at a certain frequency. The transducer 12 receives acoustic signals over a wide range of frequencies and sends these signals to amplifier 14. The output of amplifier 14 is restricted to a narrow range of frequencies. Thus amplifier 14 serves as a filter.

The transponder receiver circuit 8 operates in a first interrogate mode. The interrogate mode is described below. A surface ship sends a single frequency acoustic interrogate signal to the transponder receiver circuit 8. This signal is picked up by transducer 12. The interrogate signal is amplified by amplifier 14 and detected by detector 16 of the receiver circuit 8. The detector 16 operates at a single frequency. The receiver circuit 8 will immediately response back to the ship with an interrogate response signal as a result of the reception of the interrogate signal. The frequency of the interrogate response signal from the receiver circuit 8 is selectable at the factory.

Hybrid tone detector 16 is referred to in U.S. Pat. No. 3,320,576. The teachings of the '576 patent are incorporated herein by reference. Detector 16 is a device for comparing energy within a narrow band to energy within a broader band. The tone detector 16 sends out a NAV signal if the ratio of the energy in the narrow band to the energy in a boarder band is greater than a certain value. The NAV signal thus goes up and stays up as the interrogate command signal, mentioned above, is presented to it. Thus the interrogate mode operates by receiving an interrogate input signal, at transducer 12, and sending out a NAV signal from tone detector 16. The circuit 8 initiates immediate transmission of an interrogate response signal by use of the NAV signal.

The response frequency of tone detector 16 is controlled by means of tone detector frequency selector 20. The tone detector frequency selector 20 has several banks of capacitors, one bank of which is selected to operate in conjunction with the coil of the detector 16, to select a respond frequency for detector 16. The bank of capacitors of frequency selector 20 is selected by digital means by receiver control interface 26.

The hybrid tone detector 16 is continuously powered, so as to be continuously responsive to an interrogate input signal. The receiver control interface 26 has a series of logic devices. This allows receiver control interface 26 to each selection frequency determined by tone detector frequency selector 20.

The receiver control interface 26 is driven through opto couplers 27, 28 and 29 that couple a microprocessor 30 to the receiver control interface 26. The other inputs to control interface 26 come from the status logic. These other inputs can be used by the receiver control interface 26 to set an operating frequency of tone detector 16.

Besides the interrogate mode, there are three sub-modes of operation under the interrogate mode, for the receiver circuit 8. These are selected by EIA commands. These submodes are a turn-off submode for the interrogate mode, a turn-on again submode for the interrogate mode, and a release submode to allow a transponder, that holds circuit 8, to raise to the surface of the sea.

In the turn-off mode a series of pulses is accepted. For receiving the submode signals, namely turn-off, turn-on again, and release, a longer duration signal is sent to the receiver circuit 8, than the normal interrogate input signal. The longer duration signal, is F-M modulated at EIA command frequencies. The longer duration signal goes through the hybrid tone detector 16 and out of the COM output. It is pulse shaped in the pulse shaping monostable multivibrator unit 31. If the duration of the signal is long enough, the wake up unit 32 is activated. When the wake-up unit 32 is activated, the wake-up signal indicates that a submode signal is being sent. The wake-up signal from wake-up unit 32 turns on the power to dual hybrid command decoder 34. The dual command decoder 34 detects the EIA modulated command signal. If a proper preprogrammed command signal is detected by command decoder 34, a signal from the command decoder 34 will trigger either monostable multivibrator 36 or 38. This triggering of one or the other multivibrator 36 or 38 depends on the type of submode signal that is received. A signal out of either multivibrator 36 or 38 will turn on dual hybrid command decoder 42. The signal from either multivibrator 36 or 38 will also go into receiver control interface 26 and thence into power controller 24 to turn on hybrid tone detector 18. Thus the receiver circuit 8 is able to receive the second half of the EIA command through hybrid tone detector 18.

Once a proper command is detected out of dual hybrid command decoder 34, the other half of the detector subsystem, namely dual hybrid command decoder 42 and hybrid tone detector 18, can then detect the second half of the EIA command. The combination of monostable multivibrator 44 and decoder 42 are identical in function to the combination of monostable multivibrator 31 and decoder 34. Both combinations can be programmed for a wide variety of EIA frequencies, thus allowing for a large amount of selectability, for the different sub commands.

In order for the circuit 8 to go from the interrogate mode of operation to a beacon mode of operation, a switching frequency signal is used. In order to turn on tone detector 18 in the beacon mode, a beacon input signal is used. The switching of the frequency of the beacon input signal is detected by detector 16. Detector 16 operates on the pulses of this switching frequency of the beacon input signal. The detector 16 and associated circuitry detect the switching and wake-up unit 32 is activated, through the COM output, by the switching frequency signal. A signal from wake-up unit 32 is sent through decoder 34 and multivibrator 36 to interface circuit 26 to indicate that a beacon input signal is being received.

While the transponder is actively responding to interrogate signals, and for up to minute after they cease, it can receive beacon input signals. In these instances the CPU 30 recognizes that is being interrogated by the opto-coupled interface circuit 26 and in-turn the CPU 30 sends a signal through opto couplers 27, 28 and 29. Signals from the optocouplers 27, 28, and 29 are sent to receiver controller interface 26 and receiver controller interface 26 turns on the power controller 24. Power controller 24 turns on hybrid tone detector 18. Detector 18 will respond to a beacon input signal. The hybrid tone detector 18 can detect a first sync pulse of a beacon input signal. At this point the circuit 8 is ready to receive a beacon input signal word (or message).

It is noted that while the CPU 30 is used in activating the beacon mode, it is not used in the interrogate mode and interrogate submodes, including the release submode. Hardware is used to accomplish the submode action, since the CPU 30 might not be operable.

For the beacon mode, once a first syn pulse is detected by hybrid tone detector 18, and detected in turn by the CPU 30 from the output of detector 18, the response frequency of detector 16 is changed by CPU 30. The CPU 30 waits for another signal to come through detector 16. If the other signal does come through in the proper time, the signal will cause the CPU 30 to send a signal through the opto couplers 27, 28 and 29 to the receiver control interface 26. Interface 26 then changes the response frequency of detector 16 and the response frequency of detector 18. These detectors 16 and 18 can then receive a beacon input signal word.

The beacon input signal word is received by receiver circuit 8. The beacon input signal word carries information on it as to the type of beacon input signal that it is and any programming instructions or any transmit instructions. A first frequency of the switching frequency of the beacon input signal represents a logic 1. A second frequency of the switching frequency of beacon input signal represents a logic 0. These levels can be timed out and detected.

When a beacon input signal is received, it is determined by the CPU whether it is a beacon program input signal or a beacon transmit input signal. If it is a beacon transmit input signal, the receiver 8 initiates transmission of a beacon response signal having selected beacon frequency, a preprogrammed pulse width, source level and duration. The initiation is the NAV signal out of tone detection 18. This is a triggering signal.

As a part of receiving the beacon input signal, after the first beacon input signal word has been received, the response frequency of hybrid tone detector 16 is again reset and the response frequency of hybrid tone detector 18 is reset. The same beacon message word, as the first word, is repeated, but at new frequencies. The CPU 30 is detecting at this time. The CPU 30 responses to the digital ones and zeros of the words. The CPU 30 creates a command word instruction as a result of these bits.

The beacon mode has two submodes. One is the program submode. The other is the transmit (response) submode. The program sub mode has the ability to preset the beacon response signal duration that circuit 8 will be commanded to transmit. The duration may be preset. Further the source level of the beacon response signal may be preset. When one is farther from the circuit 8, one would want a stronger output than when one is closer to the circuit 8.

There are three groups of codes for the transmit submode. Two are program commands. One of them is an individual ID code that addresses a particular transponder, having a circuit 8, in a group of such transponders. An individual transponder is associated with its preset beacon transmit (response) frequency. A transmit oscillator generates an acoustic beacon response signal. The digital word has an ID command that addresses a transponder that has a specific preset beacon transmit (response) frequency. Another ID command is a group identification, so that all transponders in a group of transponders would accept the program command. The ID command for the individual transponder is a program only command. There is a group program command which all transponders accept regardless of their identification. The transponders will preset their source level and pulse width as well.

A third ID command is the transmit (response) ID command. The transmit ID command ignores the part of the digital word that describes the source level and only causes a transponder to transmit (respond).

Programming depends on the digital code. One can use a digital code that sets the transmit time. The transmission command is placed in the CPU 30, for the next transmission. Also, with regard to the source level, the set command commands a longer transmission. This command is then preset into the CPU 30 so that in the next transmission, the transponder will perform in that manner.

The hybrid clipper amplifier 14 acts as a broadband filter and limits signals received by the transducer. A limiting stage within amplifier 14 produces a fully-limited signal with constant energy level regardless of input signal level or frequency. When an in-band signal is present at the input, the output of the limiter consists of a square wave at the input frequency with a signal-to-noise ratio approximately the same as that of the input. Limiter output is applied to an amplifier filter stage of amplifier 14, which converts any square-wave signal at the input to a sine wave; in the absence of a square-wave input signal, the amplifier filter produces a random-noise output.

The output of the final amplifier filter stage (sine wave or random noise) is passed through an impedance isolation state in amplifier 14 to hybrid tone detector circuits 16 and 18.

Each tone detector circuit 16 and 18 consists of a comparator and two integrators, one integrator for Navigate (interrogate input) signals and the other for Command (beacon input) signals. The comparator produces an output only when the signal level exceeds the signal level in the rest of the broad band of clipper amplifier 14. If this signal is present without interruption at the integrator for the preset integration time, the integrator output goes high and remains high as long as the input signal persists.

The time during which the comparator output must remain high to produce an output from the integrator is the "receiver recognition" time and set for the Navigate (interrogate) integrator and for the Command (beacon) integrator. Recognition time is selected to ensure that the receiver detects valid signals while rejecting noise spikes in the recognition, known as false alarms. Navigation recognition time is comparatively long, since duration and frequency are the only criteria for Navigate (interrogate input) signal detection. A shorter recognition time can be used for Command (beacon input) signal detection because the Command (beacon input) signal consists of a fixed frequency of changing frequencies, all of which must be detected otherwise command channel will not cause erroneous command recognition.

The integration circuit contains a capacitor which charges while the comparator detects a signal. When capacitor voltage reaches a predetermined level, recognition occurs. Thus integration time is determined by the rate at which the capacitor is charged. In conventional circuits of this sort, charging rate is controlled by a resistor and changes exponentially as capacitor voltage increases. For improved accuracy in the integration circuit of tone detector circuit 16, the resistor has been replaced with a constant current source, which produces a linear charge rate. This modification yields an additional advantage namely, any interruption of the input signal immediately causes the current source to short the capacitor to ground, terminating the integration cycle. Thus recognition will occur only in the presence of a signal that continues solidly through the integration period.

Navigate (interrogate input) signals are detected by tone detector 16 and produce a high level on the NAV output of that device. Release command signals are also detected by tone detector circuit 16 and produce a frequency of high levels on the COM output of that device. (Duration of the Command (beacon input) signal carries frequency pulses that are too short to produce a NAV output.) Other Command (beacon input) signals are detected by tone detector 18.

The NAV output of tone detector 16 passes to the false alarm rejection circuit 46 which selectively enables the transmit frequency oscillator and wakes up the CPU 30 in the frequency described below. A transmit frequency oscillator sends out an acoustic interrogate response signal.

First, following a period of inactivity, the receiver circuit 8 enters the sleep state: Tone detector 16 is set to the standby condition and CPU 30 is inactivated. In the standby condition the detector 16 is set up to decode incoming Navigate (interrogate input) signals and release command signals while the CPU 30 remains inactive, and the wake-up signal output to the CPU 30 is disabled by a wake-up timer in the false alarm rejection circuit 46.

Second, when a Navigate (interrogate input) signal is detected, the false alarm rejection circuit 46 enables the transmit frequency oscillator and starts a Navigate lockout time to prevent repeated recognition of a reverberate Navigate (interrogate input) signal. The Navigate (interrogate input) signal is blocked from the wake-up output, which is still disabled by the wake-up timer.

Third, at the end of the lockout period the wake-up timer of circuit 46 is turned on for its period, enabling the Navigate wake-up output circuit 46 for the next navigate signal that may be detected. Until the next Navigate (interrogate input) signal is detected, the transponder remains asleep and is therefore not able to reply to the initiate navigate signal.

Fourth, a second Navigate (interrogate input) signal is detected after the lockout period and during the wake-up timer period causes a similar sequence: The false alarm rejection circuit 46 starts the lock-out timer and resets the wake-up timer to a new period. However, since the wake-up output was enabled when the first Navigate (interrogate input) signal turned on the wake-up timer, the second navigate signal is passed as a wake-up trigger to the CPU 30. The transponder wakes up, replies to the interrogation, and remains fully awake until a period of inactivity occurs, allowing the wake-up time to run out.

Since the false alarm rejection circuit requires two Navigate (interrogate input) signal detections within a period to wake up the transponder and allow a reply, the effect of this circuit is to prevent single noise events from causing false alarms during periods of inactivity.

While the present invention has been disclosed in connection with the preferred embodiment thereof, it should be understood that there may be other embodiments which fall within the spirit and scope of the invention as defined by the following claims.

What is claimed is:

1. A transponder receiver circuit, comprising:
   (a) Transducer means for receiving a first input signal and for receiving a second input signal;
   (b) A detector means connected to the transducer means for initiating a first navigate signal in response to the first input signal and for initiating a first command signal in response to the second input signal;
   (c) Means for supplying electrical power in response to the first command signal;
   (d) Another detector means connected to the transducer means and activatable by said electrical power, for initiating a second navigate signal in response tot he second input signal and for initiating a second command signal in response to the second input signal; and
   (e) Means for initiating a first response signal in response to the first navigate signal and for initiating a second response signal in response to both the first command signal and the second command signal.

2. A transponder receiver circuit, comprising:
   (a) Transducer means for receiving a first input signal and for receiving a second input signal;
   (b) A detector means connected to the transducer means for initiating a first navigate signal in response to the first input signal and for initiating a first command signal in response to the second input signal;
c) Means for supplying electrical power in response to the first command signal;
(d) Another detector means connected to the transducer means and activatable by said electrical power, for initiating a second navigate signal in response to the second input signal and for initiating a second command signal in response to the second input signal;
(e) Logic means for initiating a transmitter enable flag signal in response jointly to the first command signal and to the second command signal; and
(f) Means for initiating a first response signal in response to the first navigate signal and for initiating a second response signal in response to the transmitter enable flag signal.

3. A transponder receiver circuit, comprising:
(a) Transducer means for receiving a first input signal and for receiving a second input signal;
(b) A detector means connected to the transducer means for initiating a first navigate signal in response to the first input signal and for initiating a first command signal in response to the second input signal;
(c) Means for supplying electrical power in response to the first command signal;
(d) Another detector means connected to the transducer means and activatable by said electrical power, for initiating a second navigate signal in response to the second input signal and for initiating a second command signal in response to the second input signal;
(e) Logic means for initiating a transmitter enable flag signal in response jointly to the first command signal and to the second command signal;
(f) False alarm rejection means for initiating an oscillator enable flag signal in response to repeating first navigate signals; and
(g) Means for initiating a first response signal in response jointly to the oscillator enable flag signal and the first navigate signal and for initiating a second response signal in response to the transmitter enable flag signal.

4. A transponder receiver circuit, comprising:
(a) Transducer means for receiving a first input signal and for receiving a second input signal;
(b) A detector means connected to the transducer means for initiating a first navigate signal in response to the first input signal and for initiating a first command signal in response to the second input signal;
(c) Command wake-up means for initiating a wake-up signal in response to the first command signal;
(d) Means responsive to the wake-up signal for initiating an activation signal;
(e) Power controller means for supplying electrical power in response to the activation signal;
(f) Another detector means connected to the transducer means and activatable by said electrical power, for initiating a second navigate signal in response to the second input signal and for initiating a second command signal in response to the second input signal;
(g) Logic means for initiating a transmitter enable flag signal in response jointly to the first command signal and to the second command signal;
(h) False alarm rejection means for initiating an oscillator enable flag signal in response to repeating first navigate signals; and
(i) Means for initiating a first response signal in response jointly to the oscillator enable flag signal and the first navigate signal and for initiating a second response signal in response to the transmitter enable flag signal.

* * * * *